*Gray & Fincher,*
*Hand Saw.*
Nº 13,390. Patented Aug. 7, 1855.
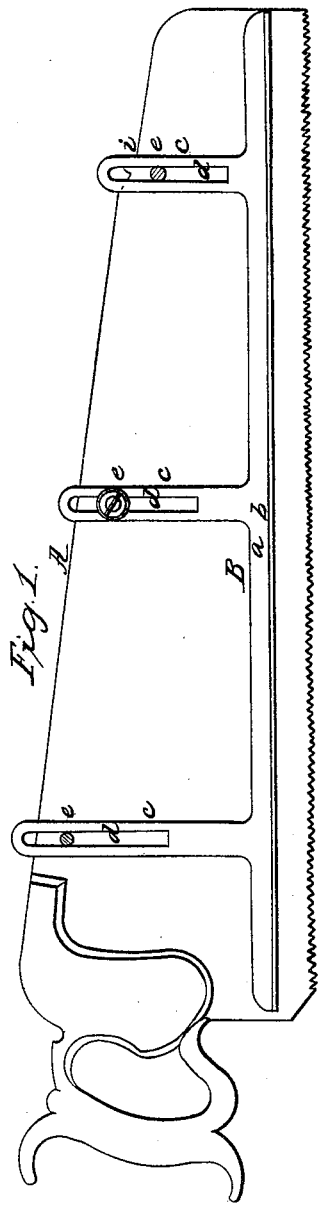
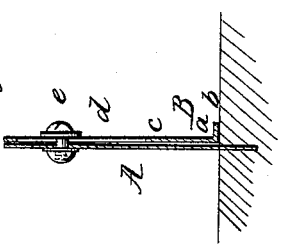

UNITED STATES PATENT OFFICE.

A. F. GRAY AND J. C. FINCHER, OF THIBODEAUX, LOUISIANA.

GAGE ATTACHMENT FOR HANDSAWS.

Specification of Letters Patent No. 13,390, dated August 7, 1855.

*To all whom it may concern:*

Be it known that we, A. F. GRAY and J. C. FINCHER, of Thibodeaux, in the parish of La Fourche and State of Louisiana, have invented a new and useful Gage Attachment to be Applied to Handsaws; and we do hereby declare that the following is a full, clear, and exact description of the same, reference being had to the annexed drawings, making a part of this specification, in which—

Figure 1, is a side view of a hand saw with our improvement applied to it. Fig. 2 is a transverse section of ditto.

Similar letters of reference indicate corresponding parts in the two figures.

The nature of our invention consists in attaching a gage to the saw as will be presently shown and described, whereby the depth of the saw cut may be regulated as desired. The improvement is valuable in forming tenons for doors, sashes, blinds, and all sorts of panel work.

To enable others skilled in the art to fully understand and construct our improvement, we will proceed to describe it.

A, represents a hand saw of the usual form, and B, represents the gage which is attached to one side of the blade.

The gage B, is formed of a metallic plate which is bent longitudinally at its center so as to form two strips ($a$) ($b$) at right angles to each other, the length of the strips being equal to the length of the blade. One of the strips ($a$) is placed against the side of the blade of the saw, the other strip ($b$) projecting at right angles from it, see Fig. 2. The strip ($a$) has lugs ($c$) formed on its upper edge which lugs project upward as far as the upper edge of the saw blade. Each lug has an oblong slot ($d$) cut through it as shown in Fig. 1, and set saws ($e$) pass through the slots ($d$) and saw blade. By adjusting the set screws ($e$) the strips ($a$) ($b$) may be moved and secured at any distance above the teeth of the blade, and parallel with them.

In forming tenons the saw cuts at each side of the stuff are made a certain depth, and the stuff is now gaged or marked to indicate the required depth. By our improvement, the strips ($a$) ($b$) are set the required distance from the teeth of the saw blade, and the saw of course can only cut a distance equal to the space between the teeth and the strips.

The invention is extremely simple and useful, it may be applied to all hand saws, and when the gage is not required it may be detached from the saw.

What we claim as new and desire to secure by Letters Patent is—

Attaching to one side of the blade of a hand saw a gage formed of two strips ($a$) ($b$), and lugs ($c$) having slots ($d$) made in them through which slots set screws ($e$) pass, the screws also passing through the saw blade substantially as shown and for the purpose herein set forth.

A. F. GRAY.
J. C. FINCHER.

Witnesses:
Louis M. Rubs,
V. D. Emebonne.